United States Patent
Sherwood

(10) Patent No.: US 7,395,669 B2
(45) Date of Patent: Jul. 8, 2008

(54) GAS TURBINE ENGINE COMBUSTOR

(75) Inventor: David J Sherwood, Bristol (GB)

(73) Assignee: Rolls-Royce plc, London (GB)

( * ) Notice: Subject to any disclaimer, the term of this patent is extended or adjusted under 35 U.S.C. 154(b) by 740 days.

(21) Appl. No.: 10/230,167

(22) Filed: Aug. 29, 2002

(65) Prior Publication Data

US 2003/0046934 A1    Mar. 13, 2003

(30) Foreign Application Priority Data

Sep. 11, 2001   (GB)  ................. 0121916.1
Jul. 1, 2002   (GB)  ................. 0215146.2

(51) Int. Cl.
   *F02C 1/00*     (2006.01)
   *F23R 3/06*     (2006.01)

(52) U.S. Cl. ........................................ 60/752
(58) Field of Classification Search .................. 60/752, 60/754–760; 431/352
See application file for complete search history.

(56) References Cited

U.S. PATENT DOCUMENTS 3,656,297 A * 4/1972 Monk ........................ 60/755
3,899,882 A    8/1975 Parker
3,981,142 A    9/1976 Irwin
4,233,123 A   11/1980 Hammer, Jr.
4,315,405 A * 2/1982 Pidcock et al. ................. 60/752
4,629,416 A * 12/1986 Voorheis ..................... 431/352
5,235,805 A    8/1993 Barbier et al.
5,329,773 A    7/1994 Myers et al.
5,337,568 A    8/1994 Lee et al.
5,388,412 A    2/1995 Schulte-Werning et al.
6,101,814 A * 8/2000 Hoke et al. ................... 60/752

FOREIGN PATENT DOCUMENTS

| GB | 2 037 419 A | 7/1980 |
| GB | 1 605 202 | 7/1983 |
| GB | 1605202 | 7/1983 |
| JP | 59-013829 | 1/1984 |
| JP | 59013829 | 1/1984 |

* cited by examiner

*Primary Examiner*—Ted Kim
(74) *Attorney, Agent, or Firm*—Oliff & Berridge, PLC

(57) ABSTRACT

A combustor for a gas turbine engine comprising at least one combustor air intake chute wherein at least one of the air intake chutes is configured to enhance the heat transfer relationship between the chute material and the air flowing over it. The air intake chutes have at least one raised feature formed on their inner surface which extends into the airflow passing through the chute. The raised features may take the form of a circumferential rib, an axial rib or a pedestal, or any combination of the same.

15 Claims, 3 Drawing Sheets

GAS TURBINE ENGINE COMBUSTOR

BACKGROUND OF THE INVENTION

1. Field of Invention

The invention relates to a combustor for a gas turbine engine.

2. Description of Related Art

In particular it concerns an improved means for cooling the air intake chutes of a gas turbine combustor, especially a means for configuring the surface of an air intake chute so as to enhance the heat transfer between the chute and the air flowing through it.

The majority of the air entering a combustor enters at the upstream (front) end, usually close to the fuel injection points. The air mixes with and aids the vaporization of the fuel, which then ignites and burns. Throughout this process the bulk motion of the combusting gas is from the front to the back of the combustor, exiting to the turbine.

This simple air and fuel mixing method does not achieve complete combustion and may result in undesirable unburned carbon and hydrocarbon emissions as well as a non optimal turbine entry temperature profile. A commonly used solution to this situation is to pierce the combustor wall by a plurality of plain holes to provide extra, or 'dilution', air to complete the combustion process. However, because the holes direct relatively small quantities of air into the combustor, usually perpendicular to the bulk flow, the momentum of the dilution air is much lower and therefore will have an insufficient penetration depth to be fully effective. An improvement can be obtained to employ air intake chutes in the holes to shield the dilution air from the main gas flow and help turn the air direction to a steep angle to the main flow.

The chutes suffer the drawback that because they are placed immediately downstream of the fuel injectors they experience overheating and subsequent erosion due to exposure to high temperatures and their close proximity to the combustion region. The present invention seeks to avoid this drawback.

SUMMARY OF THE INVENTION

According to the present invention there is provided a combustor for a gas turbine engine comprising a combustion chamber wall having formed therein at least one hole for admitting air into the combustion chamber; at least one air intake chute attached to the wall coaxially with said hole on its inner surface; the chute having an interior surface; wherein at least one raised feature is provided in the interior of the chute which during engine operation enhances the heat transfer between the chute material and the air flowing over it.

A preferred embodiment of the invention consists of a chute with internal ribs or pedestals or some such combination or arrangement of raised features on its inner surface. These may be rectangular, rounded or some other shape in cross-section. The raised features may be positioned around the internal circumference of the chute, along its axis, or in a different pattern such as spiraling around the chute. The features may be continuous or intermittent. Pedestals may be any one of a variety of geometries, including cylindrical or rectangular and arranged in a variety of patterns.

Each raised feature is exposed to the air passing through the chute. This serves to increase transfer of heat from the chute. Each of the features should be positioned to optimize the flow over them. The invention for one of its objectives will ensure that the air intake chute is less prone to overheating than a conventional chute, thereby prolonging chute life and reducing deterioration in combustor performance. Additionally, since the chutes would be more resistant to high temperature, they could be placed in positions within the combustor in which a chute without enhanced heat transfer properties would not survive.

Raised features within the air intake chutes will interfere with the air flow and increase turbulence around the perimeter of the air jet. Hence other benefits of the invention include a potential for enhanced mixing of the air jet within the combustor. The raised features may also be used to influence the behavior of the air jet by reducing swirl or altering the velocity profile.

BRIEF DESCRIPTION OF THE DRAWINGS

The invention and how it may be constructed and operated, will now be described in greater detail with reference, by way of example, to an embodiment illustrated in the accompanying drawings, in which.

DETAILED DESCRIPTION OF PREFERRED EMBODIMENTS

Figure 1:
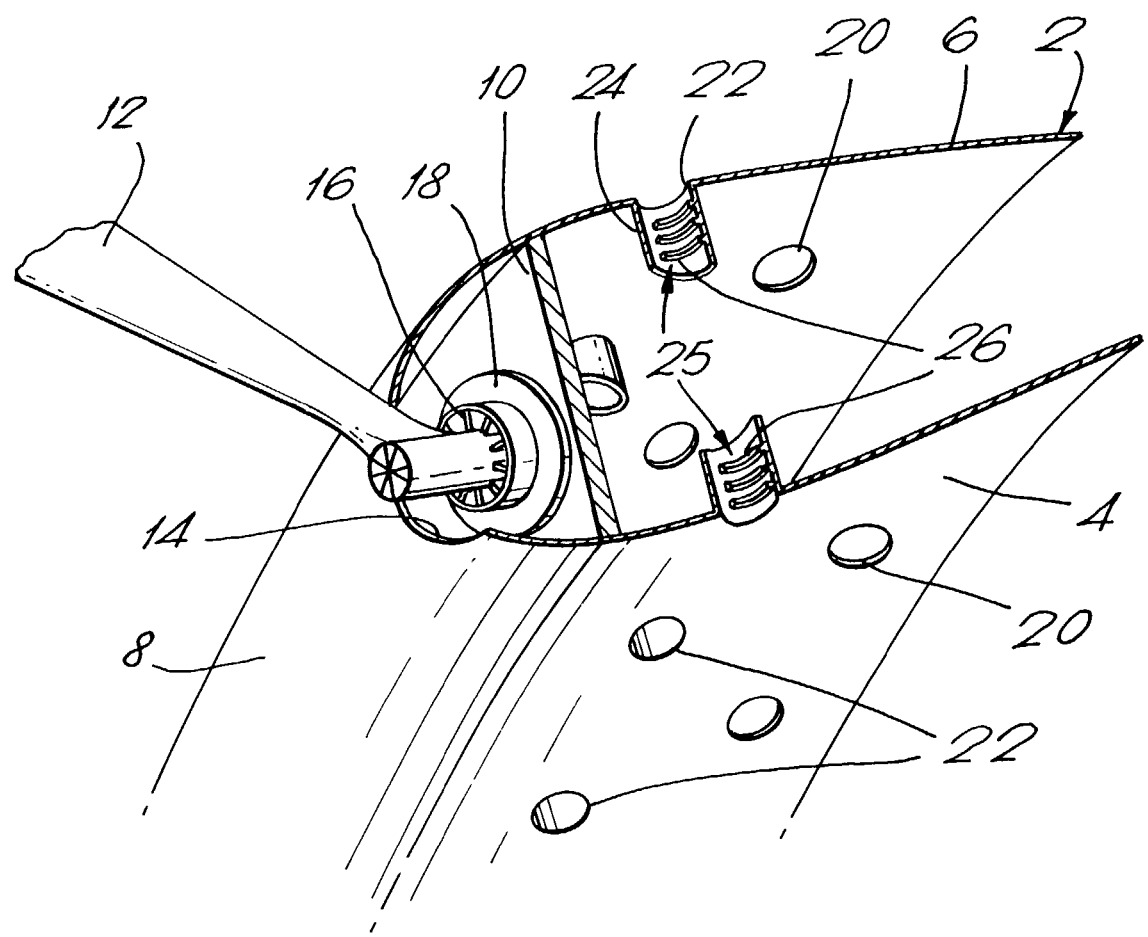
FIG. 1 shows a section of a gas turbine engines combustor having a plurality of air intake chutes according to the present invention.

FIG. 1 is sectional view of a gas turbine engine combustor 2. The overall construction and operation of the engine is of a conventional kind, well known in the field, and will not be described in this specification beyond what is necessary to gain an understanding of the invention.

The combustor 2 comprises an inner wall 4 and an outer wall 6, joined by a cowl 8 and a metering panel 10. A fuel injector 12 extends through the cowl 8 through a hole 14 where the fuel injector head 16 locates inside a sleeve 18 in the metering panel 10, leaving the end of the injector exposed to the combustion region. The injector head 16 comprises an aperture through which fuel will flow and air passages to allow air entry into the combustion region.

In this example there are two rows of holes 20,22 spaced around the circumference of the walls 4,6. Attached to the walls 4,6 coaxially with holes 22 are chutes 24. These may be cylindrical, the same diameter as hole 22 and have an angled end.

In operation, pressurized high velocity air from the engine compressor (not shown) upstream of the combustor 2 is split into three flow paths as it reaches the combustor 2. Some of the air passes though the hole 14 around the fuel injector and through the air passages in the fuel injector head 16 into the combustion region. Other air passes around the outside of the combustion chamber 2, constrained by the combustor inner and outer casings (not shown) and enters the combustion chamber through holes 20,22, passing over heat transfer features 25.

The combustion process occupies the whole of the combustion chamber 2 but, expressed crudely, can be divided up into a core combustion region (of low air fuel ratio) immediately down stream of the metering panel 10 and a dilution region (of higher air fuel ratio) occupying approximately the latter two thirds of the combustion region before the gas exits the combustor 2 to the turbine (not shown). Holes 20,22 provide air for the dilution. Chutes 24 are required to achieve the required penetration to effectively dilute the combustion region. Because of their close proximity to the combustion region the chutes 24 are prone to overheating.

Figure 2A:
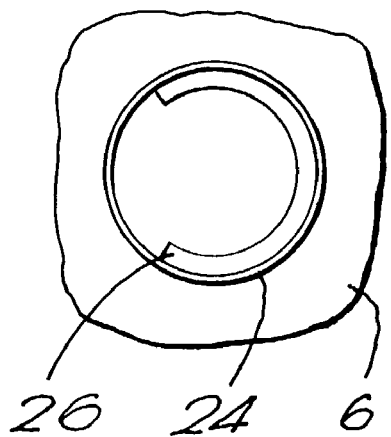
FIGS. 2A, 2B and 2C show a more detailed plan and two sectional views respectively of the air intake chute of FIG. 1 with circumferential ribs as raised features.
Figure 2B:
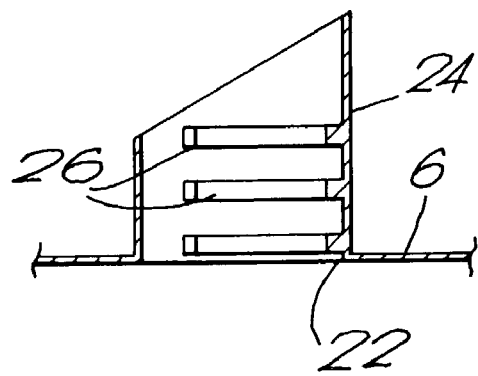
Figure 2C:
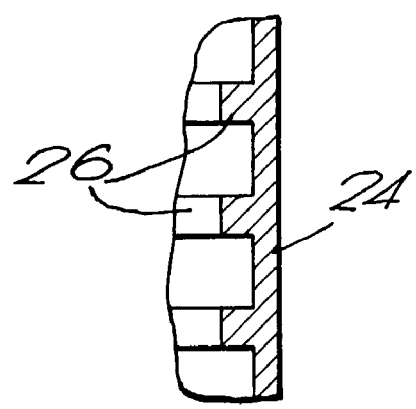

The internal surfaces of the air intake chutes 24 are configured to enhance the heat transfer relationship between the chute material and the air flowing over it during the operation of the engine. One possible way of achieving this is to have raised features 25 on the inner surface of the chute 24, an example of which is shown as a circumferential rib 26 in FIG. 1 and in more detail in a plan and two sectional views in FIGS. 2A, 2B and 2C, respectively.

Figure 3A:
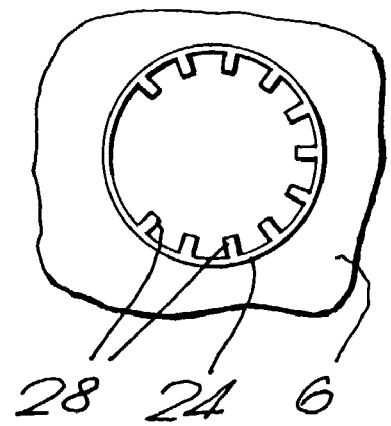
FIGS. 3A, 3B show a more detailed plan and a sectional view respectively of the air intake chute of FIG. 1 with axial ribs as raised features.
Figure 3B:
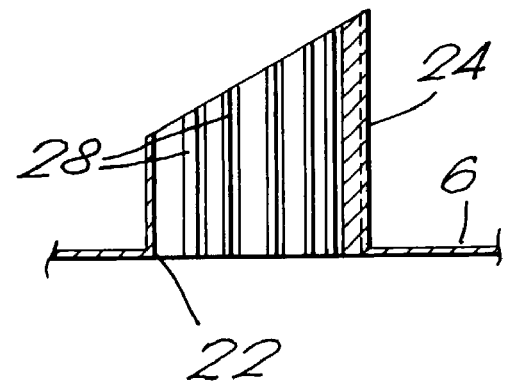

Alternatively the raised feature 25 could be aligned as an axial rib 28, presented in plan view in FIG. 3A and as a sectional side view in FIG. 3B. The circumferential rib 26 and the axial rib 28 are shown to be square angled in profile but in practice may have any shape, spacing and frequency which achieves the desired effect of enhancing the heat transfer.

Figure 4:
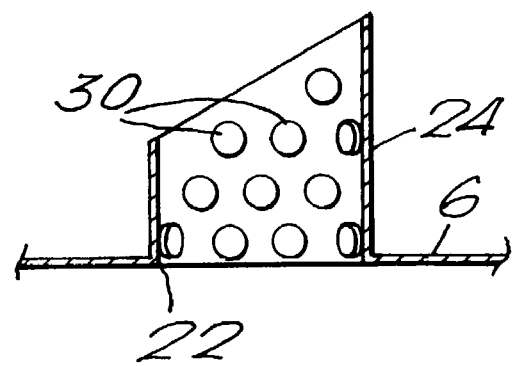
FIG. 4 shows a more detailed sectional view of an air intake chute with pedestals as raised features.

A further embodiment is a plurality of pedestals 30 mounted on the inner surface of the chute 24, as shown in FIG. 4. The pedestals 30 are shown here to be cylindrical protrusions into the air flow, however, their design need not be restricted to a cylindrical configuration and may be spherical, conical, pyramidal or rectangular. Equally the spacing and pattern of the pedestals 30 is represented only diagrammatically, and the embodiment can be any such pattern as enhances the heat transfer properties of the chute 24.

Figure 5:
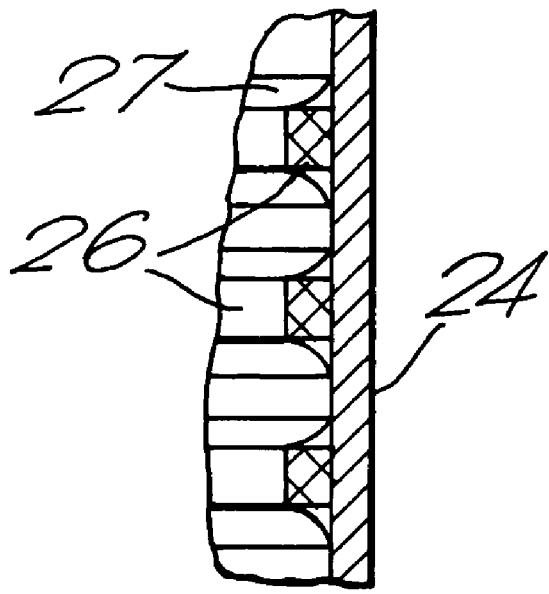
FIG. 5 shows a cross sectional view of raised features mechanically attached to the air intake chute by welding.
Figure 6:
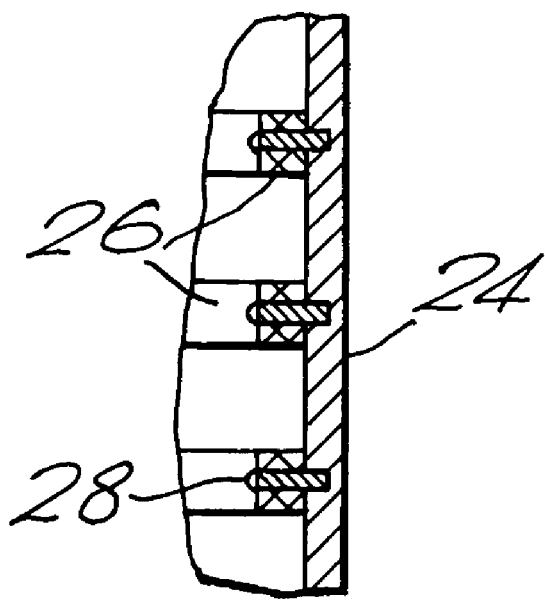
FIG. 6 shows a cross sectional view of raised features mechanically attached to the air intake chute by rivets.

The raised feature 25 may be attached to the parent chute material by a mechanical means, such as welding 27 or riveting 29, as shown in FIG. 5 and FIG. 6, or may be laid down by a means such as shaped metal deposition. Another embodiment is to form the raised feature 25 integrally with the parent chute material, such as by a casting means. In some instances it may be preferable to machine the features into the chute 24. Alternatively the desired surface characteristics may be pressed into a pre-formed plain chute 24 deforming the parent material.

The heat transfer relationship between the chute material and the air flowing over it is enhanced during the operation of the engine by disturbing a proportion of the bulk airflow, which may be laminar or turbulent depending upon the engine running conditions. In a chute 24 with a substantially smooth and featureless topology, there is a laminar boundary layer between the chute surface 24 and the bulk core airflow, which inhibits heat flux via conduction and convection. The raised features 25 of the invention extend into the airflow such that even under relatively low flow conditions the continuous laminar boundary layer is disrupted and the turbulence is increased in the periphery of the bulk air flow. This will increase the heat transfer between the chute 24 and the airflow. As there will be high air velocities in a gas turbine the raised features 25 need not obstruct the air flow greatly in order to achieve the desired cooling effect.

In one embodiment of the present invention, the raised features have a height of at least 1 mm.

The invention claimed is:

1. A combustor for a gas turbine engine, comprising a combustion chamber wall having formed therein at least one hole for admitting air into the combustion chamber and at least one air intake chute disposed coaxially with said hole,
    wherein said chute is configured such that, during engine operation, air admitted through the air intake chute is directed at an angle to a bulk flow of combusting gas and penetrates sufficiently far into the combustor to dilute the combusting gas,
    and wherein at least one third of an inside surface of said chute is provided with raised features and each of said raised features extends radially, such that during engine operation heat is transferred between the chute material and the air flowing through the chute.

2. A combustor as claimed in claim 1, wherein at least one of the raised features is provided as a circumferential rib.

3. A combustor as claimed in claim 2, wherein the at least one of the raised features has a height of at least 1 mm.

4. A combustor as claimed in claim 1, wherein at least one of the raised features is provided as an axial rib.

5. A combustor as claimed in claim 4, wherein the at least one of the raised features has a height of at least 1 mm.

6. A combustor as claimed in claim 1, wherein at least one of the raised features is provided as a pedestal.

7. A combustor as claimed in claim 6, wherein the at least one of the raised features has a height of at least 1 mm.

8. A combustor as claimed in claim 1, wherein at least one of the raised features is a deformation of the air intake chute material.

9. A combustor as claimed in claim 8, wherein the at least one of the raised features has a height of at least 1 mm.

10. A combustor as claimed in claim 1, wherein at least one of the raised features is integral with the air intake chute material.

11. A combustor as claimed in claim 10, wherein the at least one of the raised features has a height of at least 1 mm.

12. A combustor as claimed in claim 1, wherein at least one of the raised features is attached to the air intake chute by mechanical means.

13. A combustor as claimed in claim 12, wherein the at least one of the raised features has a height of at least 1 mm.

14. A combustor as claimed in claim 1, wherein at least one of the raised features has a height of at least 1 mm.

15. A combustor as claimed in claim 1, wherein said raised features extend radially part way across the interior of the chute.

* * * * *